United States Patent
Linsky

(10) Patent No.: US 8,170,482 B2
(45) Date of Patent: May 1, 2012

(54) METHOD AND APPARATUS FOR RECEIVING A TRANSMISSION AT A RECEIVER

(75) Inventor: Joel Benjamin Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 943 days.

(21) Appl. No.: 12/184,694

(22) Filed: Aug. 1, 2008

(65) Prior Publication Data

US 2010/0029230 A1    Feb. 4, 2010

(51) Int. Cl.
H04B 7/00 (2006.01)
H04B 7/24 (2006.01)
(52) U.S. Cl. .......................... 455/41.2; 455/39; 455/502
(58) Field of Classification Search .................. 455/41.2, 455/502, 39, 507, 127.5, 343.1, 574, 343.2
See application file for complete search history.

(56) References Cited

U.S. PATENT DOCUMENTS

| 7,394,782 B2 * | 7/2008 | Davis | 370/324 |
| 7,852,844 B2 * | 12/2010 | Jiang | 370/394 |
| 2005/0047363 A1 * | 3/2005 | Jiang | 370/328 |

FOREIGN PATENT DOCUMENTS

EP    1028403 A2    8/2000

OTHER PUBLICATIONS

International Search Report & Written Opinion—PCT/US2009/052592, International Search Authority—European Patent Office—Dec. 1, 2009.

Ting-Yu Lin et al: "An Adaptive Sniff Scheduling Scheme for Power Saving in Bluetooth" IEEE Wireless Communications, IEEE Service Center, Piscataway, NJ, US, vol. 9, No. 6, Dec. 1, 2002, pp. 92-103, XP011093897 ISSN: 1536-1284 abstract p. 94, left-hand column—col. 2 p. 94, paragraph 2—right-hand column, paragraph 4 p. 95, left-hand column, paragraph 2—p. 95, right-hand column, last line.

* cited by examiner

*Primary Examiner* — Sonny Trinh
(74) *Attorney, Agent, or Firm* — Kevin T. Cheatham

(57) ABSTRACT

An embodiment of the invention may include a method of receiving a transmission at a receiver. The method may include setting a receive window duration for receiving the transmission based on an elapsed time since last receiving a good transmission. The receive window duration may be a nonlinear function of the elapsed time. The method may further include opening a receive window to listen for the transmission for an amount of time equal to the set receive window duration.

56 Claims, 5 Drawing Sheets

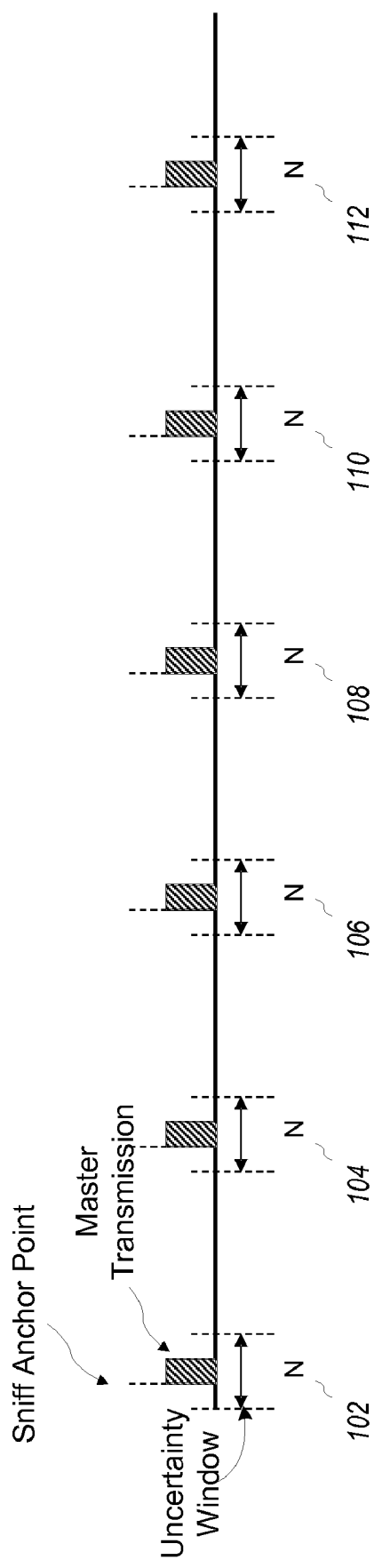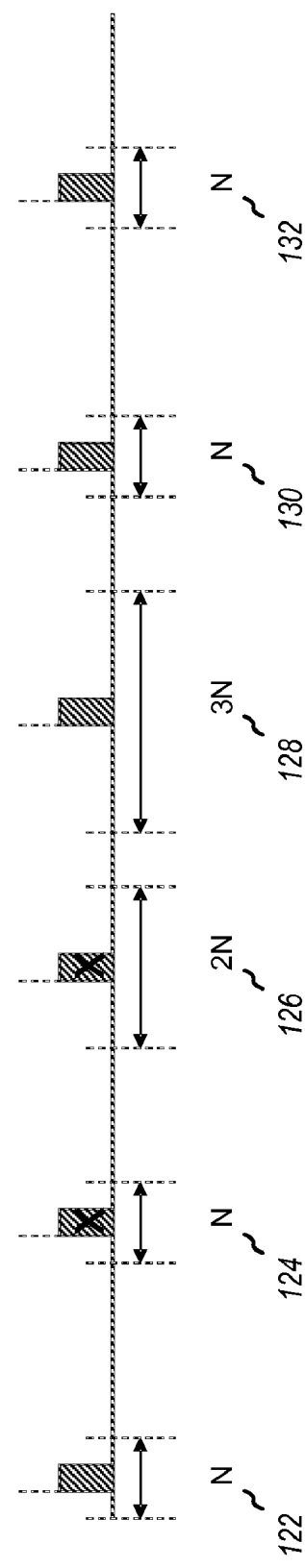

METHOD AND APPARATUS FOR RECEIVING A TRANSMISSION AT A RECEIVER

FIELD OF DISCLOSURE

The present disclosure relates generally to receiving a transmission at a receiver in a wireless communication network, and more particularly, to adjusting a receive window duration for receiving the transmission.

BACKGROUND

In a communication network including a plurality of transceivers, it may be necessary to keep the transceivers synchronized so that they use the same timing for communications. One transceiver may act as a master that defines the timing for the communication system, while the other transceivers act as slaves and keep synchronized with the timing of the master. One such network is a Bluetooth® piconet, as described, for example, in the Specification of the Bluetooth® Core System, v2.1.

Bluetooth® wireless technology is a well known short-range radio link intended to replace the cable(s) connecting portable and/or fixed electronic devices. Key features are robustness, low complexity, low power, and low cost. Bluetooth® devices operate in the unlicensed 2.4 GHz ISM band and use frequency hopping to combat interference and fading. Bluetooth® protocols use a combination of circuit and packet switching. A slotted channel is used for exchanging information through packets. Slots can be used for asynchronous operation or can be reserved for synchronous packets.

Bluetooth® systems can provide a point-to-point connection (only two Bluetooth® devices involved), or a point-to-multipoint connection. In the point-to-multipoint connection, the channel is shared among several Bluetooth® devices. Two or more devices sharing the same channel form a piconet. One Bluetooth® device acts as the master of the piconet, whereas the other device(s) acts as slave(s).

As with most battery operated technologies, power consumption is a major concern for Bluetooth® designers. Accordingly, the Bluetooth® Core Specification has defined certain low power modes, including a sniff mode.

Sniff mode allows a device to periodically wake up to listen to transmissions from the master and to re-synchronize its clock offset. A device in sniff mode retains its active mode address. Thus, sniff mode is commonly used in devices where a data flow might not be required at each moment, but where active status is still necessary, such as human interface devices or between handsets and headsets when not in an active call.

In sniff mode, the duty cycle of the slave's listening activity can be reduced. If a slave actively participates on a link, it has to listen in every slot to the master traffic.

However, in sniff mode, the time slots where the master can start transmission to a specific slave are reduced. That is, the master can only start transmission in specified time slots. These so-called sniff slots are spaced regularly with an interval of $T_{sniff}$. Thus, the sniff mode may be described as the provision of periodic moments in time when communication from the master can occur, these times being at longer intervals than available during normal operation.

The sniff parameters, interval and attempts, may be initiated by the slave device, and are chosen to satisfy data rate and latency requirements of the application, among other factors. The master polls the slave by sending a POLL packet at the sniff interval for a number of sniff attempts. The slave in turn starts listening (i.e., turns on its receiver) at the sniff slots for a packet with a matching address. If the slave device has no data to send, it replies with a NULL packet, otherwise it replies with the data packet. The POLL and NULL packets are similar in that each has a header with relevant device information, but neither has a payload. In contrast to the NULL packet, the POLL packet requires a confirmation from the recipient.

Synchronization is important for ad-hoc connections such as the Bluetooth® piconet. One way of maintaining synchronization within the network is for the master to periodically transmit radio packets with timing information. In the Bluetooth® system, the master transmits radio packet messages with a 68 microsecond Access Code in the preamble of a packet header. This Access Code is detected by a slave receiver. The reception of a message sent from the master allows the slave to compare its timing with that of the master and to adjust its timing to maintain synchronization. This may be done by adding an offset value to the value of a native clock used in the slave.

Since the master and slave use different native clocks, there is a tendency for these clocks to grow unsynchronized over time, a phenomenon known as clock drift. Accordingly, the slave must periodically resynchronize its clock with that of the master, and in addition, the drift of the two clocks must be taken into account when listening for messages. Thus, the slave listens for a message in a receive window (also referred to as an uncertainty window) of a given duration centered at the time a message is expected to be received. The size of the receive window is typically based on the drift of the master and slave native clocks.

For example, the Bluetooth® Core Specification defines an uncertainty window of +/−10 microseconds that the slave shall be able to receive packets while in active mode. Consequently, in conventional implementations the slaves listen for a message in a receive window of 88 microseconds (68 microseconds for the access code plus 20 microseconds for the uncertainty portion). This means that if a master is transmitting more than 10 microseconds earlier or more than 10 microseconds later than the slave is expecting, the slave will not receive the packet. If both master and slave are using different native clocks that are allowed to drift around 20 parts per million (ppm), the slave may lose the connection when it has not received a packet from the master within a time $t_{conloss}$=(10 microseconds)/(20 microseconds+20 microseconds)=250 ms. Therefore, if the master has not polled the slave for more than 250 ms or the environment is disturbed for that time, in the worst case, the connection will be lost.

In sniff mode, the master and slave devices are allowed to go to sleep and switch to a low power clock. Typically, the low power clocks have a much larger uncertainty than the native reference clock. The Bluetooth® Core Specification allows for a maximum low power clock accuracy of +/−250 ppm. The advantage of this approach is lower power consumption in both devices.

One of the environmental factors that can intensify clock drift is a rapid change in temperature, often referred to as thermal shock. Conventionally, native clocks have been implemented using crystal oscillators that have good resistance to thermal shock. In these systems, clock drift due to thermal shock is fairly minimal and can in most cases be ignored when determining an optimal receive window duration.

FIG. 1A is a timing diagram illustrating a receive window centered around the transmission of a master device. As shown, a master of begins transmission of a message at a sniff anchor point for a given transmission duration. A slave in sniff mode listens for the message in receive windows 102 through 112 of size N centered around the master transmission.

Messages from the master are occasionally missed by the slave due to clock drift, caused by thermal shock or otherwise. Conventionally, if a message is not received during the receive window in which the slave is listening on a given sniff attempt, the slave expands the receive window in a linear fashion for the next sniff attempt.

FIG. 1B is a timing diagram illustrating adjusting the size of a conventional receive window over multiple example sniff attempts. As shown, the size of a first uncertainty window 122 of a first sniff attempt is N, as in FIG. 1A. Assuming a successful receipt of the master transmission, the size of a second uncertainty window 124 of a second sniff attempt remains N. If the second sniff attempt fails, the size of a third uncertainty window 126 of a third sniff attempt is increased to 2N. If the third sniff attempt also fails, the size of a fourth uncertainty window 128 of a fourth sniff attempt is increased to 3N. Assuming a successful receipt of the master transmission at the fourth sniff attempt, the size of a fifth uncertainty window 130 of a fifth sniff attempt will be reset back to the original size N. Assuming another successful receipt of the master transmission at the fifth sniff attempt, the size of a sixth uncertainty window 132 of a sixth sniff attempt again remains N.

The linear relationship between the number of failed sniff attempts and the receive window duration assumes that the receive window duration should simply be proportional to the amount of time since last successfully receiving a transmission. This method is well suited to account for a drift which is not strongly temperature dependent as in the conventional crystal oscillators typically used in Bluetooth® chips.

Recently, however, in order to reduce costs, some manufacturers have begun to eliminate conventional crystal oscillators and instead base their native clocks on a reference signal found elsewhere on-chip. For example, the native clock may be based on a relaxation oscillator used for other on-chip operations. While these relaxation oscillators may provide a reference signal with a similar frequency to conventional crystal oscillators, relaxation oscillators have notably decreased thermal characteristics. Where a reference crystal oscillator may have temperature stability on the order of 2-3 ppm per degree Celsius, a relaxation oscillator may have temperature stability on the order of 2000-3000 ppm per degree Celsius. Thus, while temperature effects on clock drift may essentially be ignored for crystal oscillators, they must be taken into account when other on-chip reference signals such as relaxation oscillators are used in native clocks.

One option for dealing with the larger uncertainty of relaxation oscillators is to open a receive window for a duration that is based on a worst case temperature change. However, the total power consumption of a receive operation is directly proportional to how long the receive window remains open. Thus, this approach leads to significant undesired power consumption.

SUMMARY

Exemplary embodiments of the invention are directed to systems and methods for adjusting receive window durations in a manner that reduces power consumption when temperature is relatively stable, while still maintaining adequate connectivity to a master device when temperatures fluctuate more dramatically.

Accordingly, an embodiment can include a method of receiving a transmission at a receiver, the method comprising: setting a receive window duration for receiving the transmission based on an elapsed time since last receiving a good transmission, the receive window duration being a nonlinear function of the elapsed time; and opening a receive window to listen for the transmission for an amount of time equal to the set receive window duration.

Another embodiment can include an apparatus for receiving a transmission at a receiver, the apparatus comprising: a channel timer configured to set a receive window duration for receiving the transmission based on an elapsed time since last receiving a good transmission, the receive window duration being a nonlinear function of the elapsed time; and a channel interface configured to open a receive window to listen for the transmission for an amount of time equal to the set receive window duration.

Another embodiment can include an apparatus for receiving a transmission at a receiver, the apparatus comprising: means for setting a receive window duration for receiving the transmission based on an elapsed time since last receiving a good transmission, the receive window duration being a nonlinear function of the elapsed time; and means opening a receive window to listen for the transmission for an amount of time equal to the set receive window duration.

Another embodiment can include an apparatus for receiving a transmission at a receiver, the apparatus comprising: a processor configured to set a receive window duration for receiving the transmission based on an elapsed time since last receiving a good transmission, the receive window duration being a nonlinear function of the elapsed time, and configured to open a receive window to listen for the transmission for an amount of time equal to the set receive window duration.

Another embodiment can include a computer-readable medium including instructions executable by a processor for receiving a transmission at a receiver, the computer-readable medium comprising: a first set of computer-readable instructions executable by the processor to set a receive window duration for receiving the transmission based on an elapsed time since last receiving a good transmission, the receive window duration being a nonlinear function of the elapsed time; and a second set of computer-readable instructions executable by the processor to open a receive window to listen for the transmission for an amount of time equal to the set receive window duration.

BRIEF DESCRIPTION OF THE DRAWINGS

The accompanying drawings are presented to aid in the description of embodiments of the invention and are provided solely for illustration of the embodiments and not limitation thereof.

FIG. 1A is a timing diagram illustrating a receive window centered around the transmission of a master device.

FIG. 1B is a timing diagram illustrating adjusting the size of a conventional receive window over multiple example sniff attempts.

DETAILED DESCRIPTION

Figure 2:
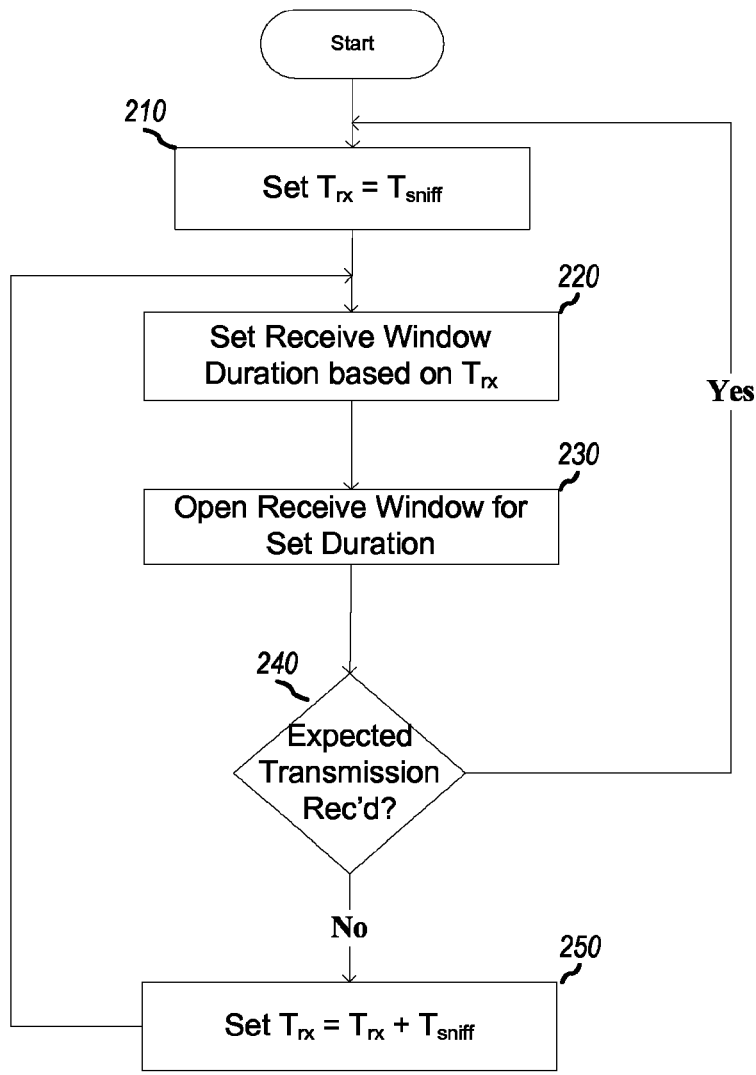
FIG. 2 is a flowchart diagram illustrating a method of receiving a transmission at a receiver according to an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. The terms "uncertainty window" and "receive window" are used interchangeably herein, and refer to the length of time a particular device actively listens for an expected transmission.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As discussed in the background, relaxation oscillators have diminished thermal characteristics as compared to crystal oscillators, which leads to a higher rate of clock drift or uncertainty. Conventional transceivers that use relaxation oscillators in place of crystal oscillators in their native clocks typically maintain time synchronization with a master by opening a receive window (or uncertainty window) for an amount of time based on a worse-case-scenario of temperature variation. This ensures that the transceiver will maintain connectivity with the master even under extreme conditions. However, this also leads to a time synchronization method that is inefficient from a power consumption perspective, and puts potentially unnecessary power demands on a system under normal operation.

Although in extreme conditions temperature may vary as widely as the worse-case-scenario estimates allow, for the majority of operation temperature remains relatively stable and the large receive windows used by conventional transceivers are unnecessary to maintain connectivity with the master. Accordingly, embodiments of the invention provide for adjusting receive window durations in a manner that reduces power consumption when temperature is relatively stable, while still maintaining adequate connectivity to a master device when temperatures fluctuate more dramatically. When larger temperature changes do occur, and a master transmission is missed, embodiments of the invention provide for maintaining network connectivity by increasing the receive window duration using a nonlinear function between receive window duration and an elapsed time $T_{rx}$ since a last good transmission from the master was received. While this may lead to temporary increased power consumption, and occasional missed transmissions, the overall power consumption may be reduced and missed transmissions may be effectively recovered in accordance with an invoking application's specific requirements.

FIG. 2 is a flowchart diagram illustrating a method of receiving a transmission at a receiver according to an embodiment of the invention.

As shown, the elapsed time $T_{rx}$ since last receiving a good transmission is initially set to a default value corresponding to a time interval between expected transmissions (block 220). In a Bluetooth® system, the default value may be equal to a time interval $T_{sniff}$ between sniff attempts when a slave is in sniff mode and expecting periodic transmissions from a master, such as POLL or NULL packets, to maintain connectivity and time synchronization.

The receive window duration used for receiving the next transmission is then set based on the elapsed time $T_{rx}$ (block 220). As discussed in the background, while it turns out that a linear expansion of the receive window based on the elapsed time $T_{rx}$ is well suited for crystal oscillators, this is not necessarily true of relaxation oscillators. According to various embodiments, the receive window duration is set using a nonlinear function of the elapsed time $T_{rx}$. The specific function used to calculate the receive window duration, i.e. how long to leave the receive window open, determines how quickly the system is able to reacquire synchronization with a master in the event that an expected transmission is not received. The longer that the receive window is open, the more likely the next transmission will be received, and the more quickly the system will be able to reacquire synchronization with the master if a transmission is missed. However, as discussed in the background, the receive window duration is directly proportional to power consumption. That is, opening the receive window for a longer duration requires more power.

The specific function used to calculate the receive window duration is application specific as it depends on the synchronization requirements of the invoking application. For example, if receiving each master transmission is very important, the function may be chosen such that the receive window increases very quickly with increasing elapsed time $T_{rx}$, at the cost of potentially higher power consumption. Conversely, if it is acceptable to miss a few or several consecutive master transmissions, the function may be chosen such that the receive window increases relatively slowly with increasing elapsed time $T_{rx}$, thereby potentially reducing power consumption. In one embodiment, the function can be a step function. The step function provides for using an initial receive window duration for a given period of time, and then subsequently expanding the receive window to a larger value. This can allow the receive window to be expanded more quickly to a desired duration, which may be appropriate for certain applications.

Table 1 illustrates several example nonlinear equations that may be used depending on the application. Table 1 is not an exhaustive list, and many other functions exist that may be useful in various application for adjusting receive window durations. Table 1 is provided merely for illustration, and is not intended to limit the scope of various embodiments of the invention. Furthermore, the function results may be calculated dynamically, stored in a look-up table, etc.

TABLE 1

| Function Type | Example Functions |
| --- | --- |
| Exponential of $T_{rx}$ | $\Delta T * \delta * 2^{Trx}$ |
| Power of $T_{rx}$ | $\Delta T * \delta * T_{rx}^2$ |
| | $\Delta T * \delta * T_{rx}^{1.75}$ |

As shown in Table 1, the receive window duration may be set as an exponential function of the elapsed time $T_{rx}$. For example, the receive window duration may be equal to $\Delta T * \delta * 2^{Trx}$. Here, $\Delta T$ represents an estimated temperature variation, $\delta$ represents an uncertainty associated with a native clock used by the receiver, and $T_{rx}$ represents the elapsed time. The native clock may be, but is not limited to, a relaxation oscillator as described above.

As also shown in Table 1, the receive window duration may be set as a function of a given power of the elapsed time $T_{rx}$. For example, the receive window duration may be equal to $\Delta T * \delta * T_{rx}^2$. Alternatively, the receive window duration may be equal to $\Delta T * \delta * T_{rx}^{1.75}$.

In the above example functions, the receive window duration is further set to be proportional to the estimated temperature variation $\Delta T$ and the uncertainty $\delta$ associated with a native clock used by the receiver. As discussed in the background, this relates the receive window duration to the built-in uncertainties of the receiver's native clock, but is not intended to suggest that these are the only factors that may be included in the proportionality constants.

Figure 3:
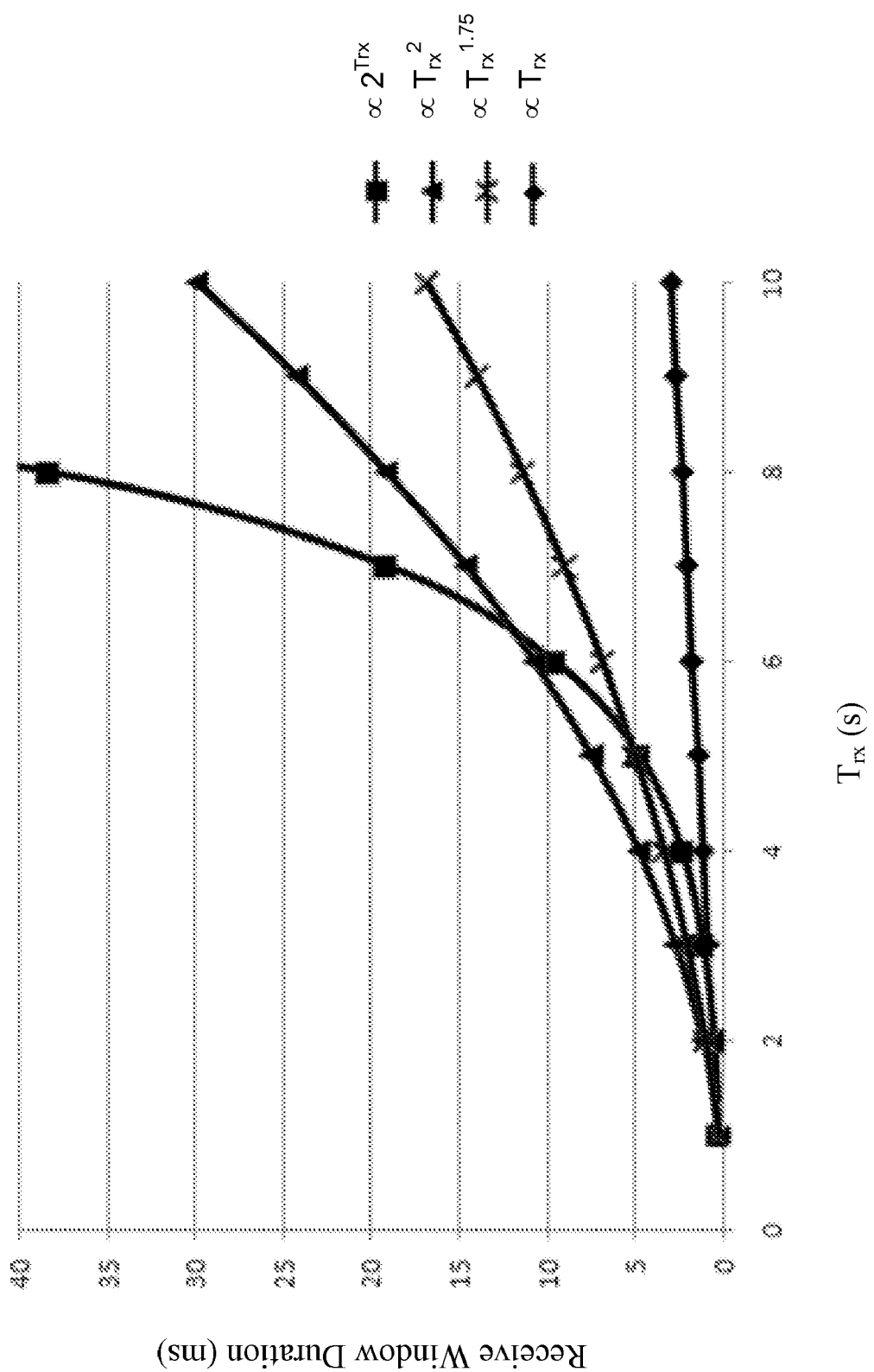
FIG. 3 is a graph illustrating the behavior of various example functions for adjusting receive window durations.

FIG. 3 is a graph illustrating the behavior of various example functions for adjusting receive window durations. The example functions are shown for an uncertainty of 3,000 parts per million (ppm) per degree Celsius, an estimated temperature variation of 0.05 degrees Celsius per second (which may be adequate under normal operating conditions), and a sniff interval $T_{sniff}$ of 1 second. The example functions of Table 1 are illustrated, as is a linear function of the elapsed time $T_{rx}$ for comparison with conventional transceiver methods described in the background.

As the elapsed time $T_{rx}$ increases, a receive window duration proportional to $2^{Trx}$ increases the fastest and provides quicker resynchronization while consuming more power. A receive window duration proportional to $T_{rx}^2$ or $T_{rx}^{1.75}$ increases more moderately and provides more moderate resynchronization while consuming more moderate power. A receive window duration proportional in a linear manner to $T_{rx}$ increases the slowest, and may in fact provide inadequate resynchronization. For example, while it consumes less power, the linear expansion may not be able to catch up to the higher clock drift of a relaxation oscillator, whereby resynchronization becomes unattainable (or unpractical).

Returning to FIG. 2, once the receive window duration is set (block 220), a receive window is opened to listen for a transmission for an amount of time equal to the set receive window duration (block 230). If the expected master transmission is successfully received (block 240), the elapsed time $T_{rx}$ is reset to the default value (block 210). If, however, the expected master transmission is not successfully received (block 240), the elapsed time $T_{rx}$ is increased (block 250). In a Bluetooth® system, for example, $T_{rx}$ may be increased recursively by adding the sniff interval $T_{sniff}$ to the previous value of the elapsed time $T_{rx}$ (e.g., $T_{rx}=T_{rx}+T_{sniff}$). The receive window duration is then adjusted based on the new value of $T_{rx}$ using the desired nonlinear function (block 220), and listening is again resumed at the next expected transmission attempt by opening a receive window for the set receive window duration (block 250). This operation of adjusting and listening is then repeated (blocks 220 through 250) until a successful master transmission is received, whereby the elapsed time $T_{rx}$ may be reset (block 210).

In some embodiments of the invention, the above described operations may be implemented in hardware.

Figure 4:
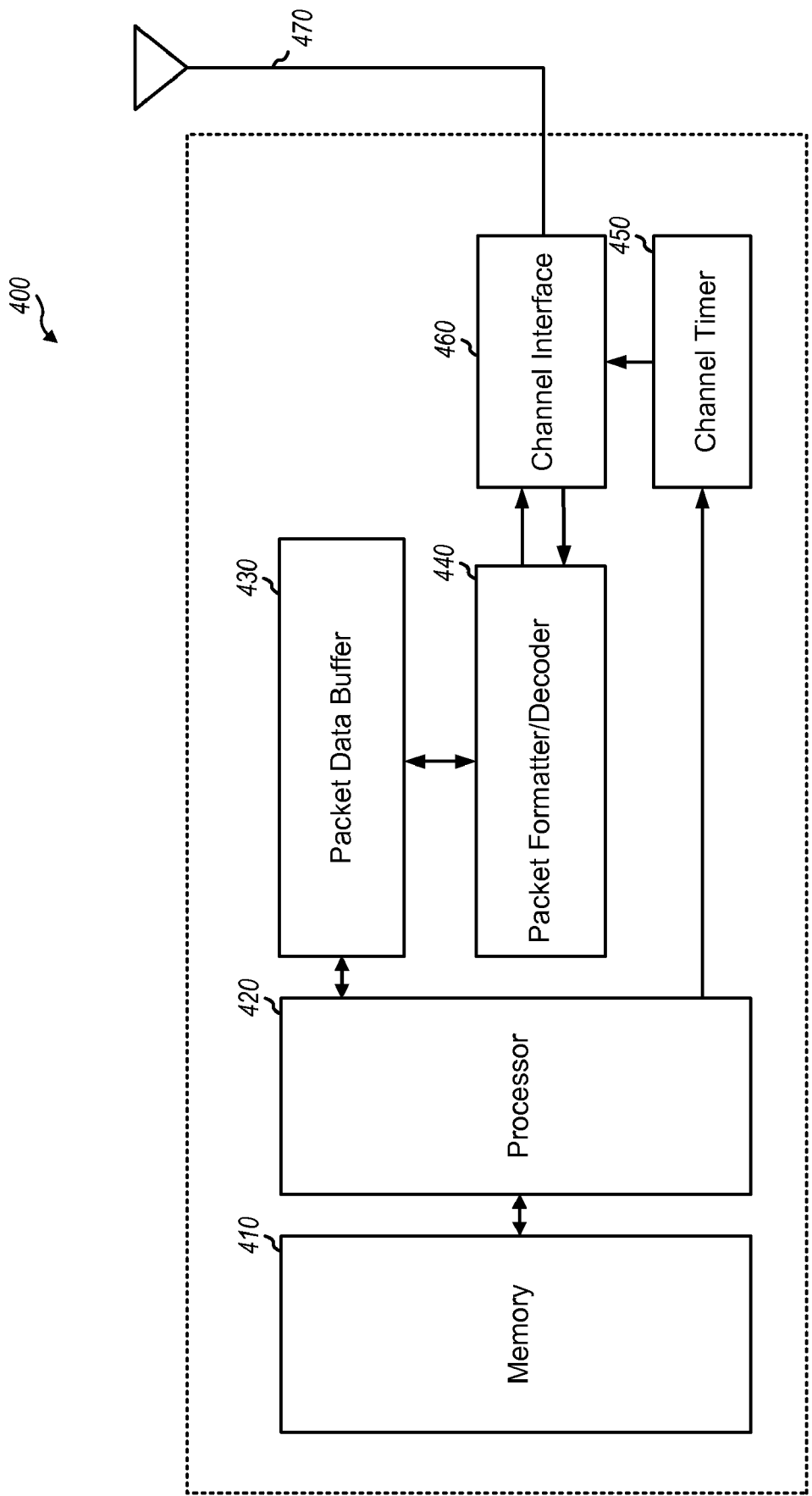
FIG. 4 illustrates an example Bluetooth® communication device for receiving a transmission according to an embodiment of the invention.

FIG. 4 illustrates an example Bluetooth® communication device for receiving a transmission according to an embodiment of the invention. Communication device 400 is capable of transmitting packets to and receiving packets from other Bluetooth® devices in a piconet according to Bluetooth® standards.

As shown, communication device 400 may include a memory 410, a processor 420, a packet data buffer 430, a packet formatter/decoder 440, a channel timer 450, channel interface circuitry 460, and/or an antenna 470. As will be appreciated by one skilled in the art, the various illustrative blocks of communication device 400 are shown for illustrative purposes only, and other configurations of a Bluetooth® communication device are possible.

Memory 410 stores executable instructions for execution by processor 420, and also stores data for various applications. Memory 410 may include random access memory (RAM), read only memory (ROM), etc. Memory 410 may alternatively be implemented internally as part of processor 420 in other configurations. Processor 420 executes instructions stored in memory 410, and reads/writes data from/to memory 410.

Processor 420 also places data into packet data buffer 430 during transmit operations, and reads data from packet data buffer 430 during reception operations. For transmit operations, packet formatter/decoder 440 reads data from packet data buffer 430 and formats transmit packets. For reception operations, packet formatter/decoder 440 decodes received packets and stores the data in packet data buffer 430.

Channel interface 460 interfaces transmit and receive communications between packet formatter/decoder 440 and antenna 470. Channel interface 460 is coupled with antenna 470 to provide a physical channel. Antenna 470 propagates wireless signals along communication links of the associated piconet (not shown). Channel interface 460 implements radio frequency (RF) wireless communications within a frequency band of 2400-2483.5 MHz in accordance with the Bluetooth® standard. Channel timer 450 coordinates transmitting and receiving packets in accordance with the Bluetooth® channel timing structure, including opening a receive window of a given duration for receiving transmissions from a master, such as during sniff attempts.

In the embodiment shown, channel timer 450 is also configured to adjust the receive window duration according to operations similar to those described substantially above with reference to the flow diagram of FIG. 2.

More specifically, while communication device 400 is operating in sniff mode, channel timer 450 initially sets the elapsed time $T_{rx}$ to a default value corresponding to the sniff interval $T_{sniff}$. Channel timer 450 then sets the receive window duration used for receiving the next transmission based on a nonlinear function of the elapsed time $T_{rx}$. The specific function used to calculate the receive window duration is again application specific, and may be any of the functions listed in Table 1, or another nonlinear function suitable for the synchronization requirements of the particular application. Channel timer 450 further sets the receive window duration to be proportional to the estimated temperature variation $\Delta T$ and the uncertainty $\delta$ associated with a native clock (not shown) used by the communication device 400.

Once the receive window duration is set, channel timer 450 instructs the channel interface circuitry 460 to open a receive window to listen for a transmission for an amount of time equal to the set receive window duration. If the expected master transmission is successfully received, channel timer 450 resets the elapsed time $T_{rx}$ to its default value. If, however, the expected master transmission is not successfully received, channel timer 450 increases the elapsed time $T_{rx}$ recursively by adding the sniff interval $T_{sniff}$ to the previous value of the elapsed time $T_{rx}$ (e.g., $T_{rx} = T_{rx} + T_{sniff}$). Channel timer 450 then adjusts the receive window duration based on the new value of $T_{rx}$ using the desired nonlinear function, and instructs the channel interface circuitry 460 to resume listening at the next expected transmission attempt by opening a receive window for the set receive window duration. The channel timer repeats adjusting and instructing the channel interface circuitry to listen until a successful master transmission is received, whereby the elapsed time $T_{rx}$ may be reset.

While particular embodiments have been shown in relation to a Bluetooth® communication system, it will be appreciated by one skilled in the art that the techniques described herein are more generally applicable to any generic wireless communication system where certain devices go into a low power mode of operation between reception opportunities of regular transmissions from other devices.

Figure 5:
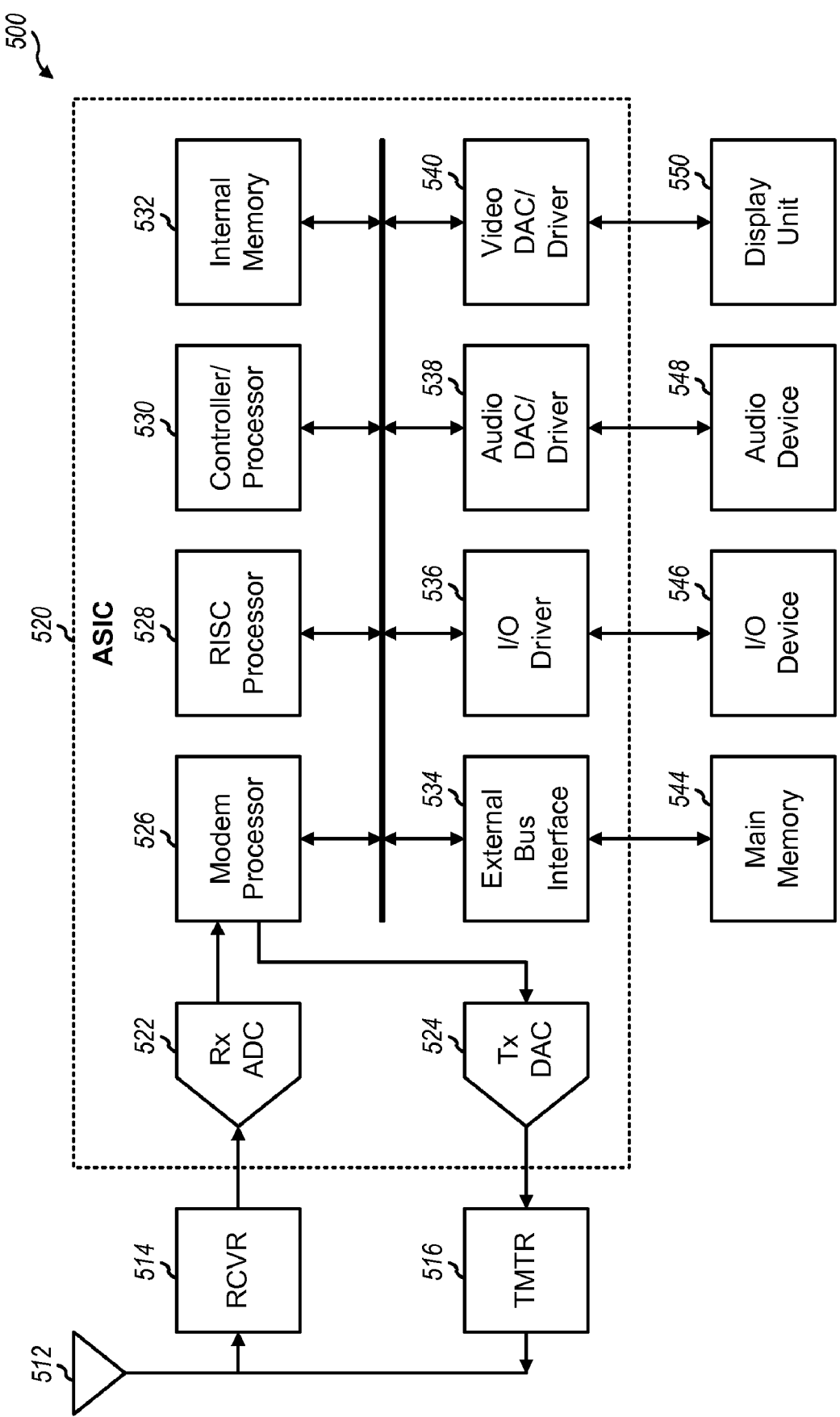
FIG. 5 shows a block diagram of a design of a generic wireless communication device in a wireless communication system.

FIG. 5 shows a block diagram of a design of a generic wireless communication device 500 in a wireless communication system. Wireless device 500 may be a cellular phone, a terminal, a handset, a personal digital assistant (PDA), etc. The wireless communication system may be a Code Division Multiple Access (CDMA) system, a Global System for Mobile Communications (GSM) system, etc.

Wireless device 500 is capable of providing bidirectional communication via a receive path and a transmit path. On the receive path, signals transmitted by base stations (not shown) are received by an antenna 512 and provided to a receiver (RCVR) 514. Receiver 514 conditions the received signal and provides an analog input signal to an application specific integrated circuit (ASIC) 520. On the transmit path, a transmitter (TMTR) 516 receives and conditions an analog output signal from ASIC 520 and generates a modulated signal, which is transmitted via antenna 512 to the base stations.

ASIC 520 may include various processing, interface, and memory units such as, e.g., a receive ADC (Rx ADC) 522, a transmit DAC (Tx DAC) 524, a modem processor 526, a reduced instruction set computing (RISC) processor 528, a controller/processor 530, an internal memory 532, an external bus interface 534, an input/output (I/O) driver 536, an audio DAC/driver 538, and a video DAC/driver 540. Rx ADC 522 digitizes the analog input signal from receiver 514 and provides samples to modem processor 526. Tx DAC 524 converts output chips from modem processor 526 from digital to analog and provides the analog output signal to transmitter 516. Modem processor 526 performs processing for data transmission and reception, e.g., encoding, modulation, demodulation, decoding, etc. RISC processor 528 may perform various types of processing for wireless device 500, e.g., processing for video, graphics, higher layer applications, etc. Controller/processor 530 may direct the operation of various processing and interface units within ASIC 520. Internal memory 532 stores data and/or instructions for various units within ASIC 520.

EBI 534 facilitates transfer of data between ASIC 520 and a main memory 544. I/O driver 536 drives an I/O device 546 via an analog or digital interface. Audio DAC/driver 538 drives an audio device 548, which may be a speaker, a headset, an earpiece, etc. Video DAC/driver 540 drives a display unit 550, which may be a liquid crystal display (LCD), etc.

Controller/processor 530 and/or other units may be configured to implement the techniques described herein for adjusting a receive window duration. For example, controller/processor 530 may be configured to adjust the receive window duration as described substantially above with reference to the flow diagram of FIG. 2, or in a manner similar to the channel timer 450 described above with reference to FIG. 4.

Alternatively, in other embodiments of the invention, the above described operations may be implemented in software.

In one such embodiment, memory 410 of the Bluetooth® communication device 400 shown in FIG. 4 may include computer-readable instructions executable by processor 420 to adjust the receive window duration. In another such embodiment, internal memory 532 or main memory 544 of the generic wireless communication device 500 shown in FIG. 5 may include computer-readable instructions executable by controller/processor 530 or RISC processor 528 to adjust the receive window duration. For example, the computer-readable instructions may include sets of computer-readable instructions executable by processor 420 to carry out the operations described substantially above with reference to the flow diagram of FIG. 2.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, as discussed above, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include computer readable media embodying a method for receiving a transmission at a receiver. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of receiving a transmission at a receiver, the method comprising:
    setting a receive window duration for receiving the transmission to a default value based on a time interval between expected transmissions;
    adjusting the receive window duration based on an elapsed time since last receiving a good transmission, the adjusted receive window duration being a nonlinear function of the elapsed time; and
    opening a receive window to listen for the transmission for an amount of time equal to the adjusted receive window duration.

2. The method of claim 1, further comprising:
    resetting the receive window duration to the default value if the transmission is successfully received.

3. The method of claim 1, wherein the receiver is a 2.4 GHz ISM band receiver, and the default value is based on a time interval between sniff attempts in a system that operates on the 2.4 GHz ISM band.

4. The method of claim 1, further comprising:
    adjusting the receive window duration to be proportional to an estimated temperature variation and an uncertainty associated with a native clock used by the receiver.

5. The method of claim 4, wherein the estimated temperature variation is about 0.05 degrees Celsius per second.

6. The method of claim 4, wherein the native clock is a relaxation oscillator.

7. The method of claim 4, wherein the uncertainty is about 3,000 parts per million per degree Celsius.

8. The method of claim 1, wherein the receive window duration is adjusted as an exponential function of the elapsed time.

9. The method of claim 8, wherein the adjusted receive window duration is equal to $\Delta T * \delta * 2^{Trx}$, where $\Delta T$ is an estimated temperature variation, $\delta$ is an uncertainty associated with a native clock used by the receiver, and $T_{rx}$ is the elapsed time.

10. The method of claim 1, wherein the receive window duration is adjusted as a function of a given power of the elapsed time.

11. The method of claim 10, wherein the adjusted receive window duration is equal to $\Delta T * \delta * T_{rx}^{n}$, where $\Delta T$ is an estimated temperature variation, $\delta$ is an uncertainty associated with a native clock used by the receiver, $T_{rx}$ is the elapsed time, and n is fractional or whole number greater than 1.

12. The method of claim 11, wherein n is equal to 2.

13. The method of claim 11, wherein n is equal to 1.75.

14. The method of claim 1, wherein results of the nonlinear function are calculated dynamically.

15. The method of claim 1, wherein results of the nonlinear function are stored in a look-up table.

16. The method of claim 1, wherein the nonlinear function is a step function providing a first receive window duration for a given period of time and a second receive window duration after the given period of time, the second receive window duration being larger than the first receive window duration.

17. An apparatus for receiving a transmission at a receiver, the apparatus comprising:
    a channel timer configured to set a receive window duration for receiving the transmission to a default value based on the time interval between expected transmissions, and to adjust the receive window duration based on an elapsed time since last receiving a good transmission, the adjusted receive window duration being a nonlinear function of the elapsed time; and
    a channel interface configured to open a receive window to listen for the transmission for an amount of time equal to the adjusted receive window duration.

18. The apparatus of claim 17, wherein the channel timer is further configured to reset the receive window duration to the default value if the transmission is successfully received.

19. The apparatus of claim 17, wherein the receiver is a 2.4 GHz ISM band receiver, and the default value is based on a time interval between sniff attempts in a system that operates on the 2.4 GHz ISM band.

20. The apparatus of claim 17, wherein the channel timer is further configured to adjust the receive window duration to be proportional to an estimated temperature variation and an uncertainty associated with a native clock used by the receiver.

21. The apparatus of claim 17, wherein the receive window duration is adjusted as an exponential function of the elapsed time.

22. The apparatus of claim 21, wherein the adjusted receive window duration is equal to $\Delta T * \delta * 2^{Trx}$, where $\Delta T$ is an estimated temperature variation, $\delta$ is an uncertainty associated with a native clock used by the receiver, and $T_{rx}$ is the elapsed time.

23. The apparatus of claim 17, wherein the receive window duration is adjusted as a function of a given power of the elapsed time.

24. The apparatus of claim 23, wherein the adjusted receive window duration is equal to $\Delta T * \delta * T_{rx}^{n}$, where $\Delta T$ is an estimated temperature variation, $\delta$ is an uncertainty associated with a native clock used by the receiver, $T_{rx}$ is the elapsed time, and n is fractional or whole number greater than 1.

25. The apparatus of claim 24, wherein n is equal to 2.

26. The apparatus of claim 24, wherein n is equal to 1.75.

27. An apparatus for receiving a transmission at a receiver, the apparatus comprising:
    means for setting a receive window duration for receiving the transmission to a default value based on a time interval between expected transmissions;

means for adjusting the receive window duration based on an elapsed time since last receiving a good transmission, the adjusted receive window duration being a nonlinear function of the elapsed time; and means opening a receive window to listen for the transmission for an amount of time equal to the adjusted receive window duration.

28. The apparatus of claim 27, wherein the means for adjusting the receive window duration resets the receive window duration to the default value if the transmission is successfully received.

29. The apparatus of claim 27, wherein the means for adjusting the receive window duration adjusts the receive window duration to be proportional to an estimated temperature variation and an uncertainty associated with a native clock used by the receiver.

30. The apparatus of claim 27, wherein the receive window duration is adjusted as an exponential function of the elapsed time.

31. The apparatus of claim 30, wherein the adjusted receive window duration is equal to $\Delta T * \delta * 2^{T_{rx}}$, where $\Delta T$ is an estimated temperature variation, $\delta$ is an uncertainty associated with a native clock used by the receiver, and $T_{rx}$ is the elapsed time.

32. The apparatus of claim 27, wherein the receive window duration is adjusted as a function of a given power of the elapsed time.

33. The apparatus of claim 32, wherein the adjusted receive window duration is equal to $\Delta T * \delta * T_{rx}^{n}$, where $\Delta T$ is an estimated temperature variation, $\delta$ is an uncertainty associated with a native clock used by the receiver, $T_{rx}$ is the elapsed time, and n is fractional or whole number greater than 1.

34. The apparatus of claim 33, wherein n is equal to 2.

35. The apparatus of claim 33, wherein n is equal to 1.75.

36. An apparatus for receiving a transmission at a receiver, the apparatus comprising:

a processor configured to set a receive window duration for receiving the transmission to a default value based on the time interval between expected transmissions, to adjust the receive window duration based on an elapsed time since last receiving a good transmission, the adjusted receive window duration being a nonlinear function of the elapsed time, and to open a receive window to listen for the transmission for an amount of time equal to the adjusted receive window duration.

37. The apparatus of claim 36, wherein the processor is further configured to reset the receive window duration to the default value if the transmission is successfully received.

38. The apparatus of claim 36, wherein the processor is further configured to adjust the receive window duration to be proportional to an estimated temperature variation and an uncertainty associated with a native clock used by the receiver.

39. The apparatus of claim 36, wherein the receive window duration is adjusted as an exponential function of the elapsed time.

40. The apparatus of claim 39, wherein the adjusted receive window duration is equal to $\Delta T * \delta * 2^{T_{rx}}$, where $\Delta T$ is an estimated temperature variation, $\delta$ is an uncertainty associated with a native clock used by the receiver, and $T_{rx}$ is the elapsed time.

41. The apparatus of claim 36, wherein the receive window duration is adjusted as a function of a given power of the elapsed time.

42. The apparatus of claim 41, wherein the adjusted receive window duration is equal to $\Delta T * \delta * T_{rx}^{n}$, where $\Delta T$ is an estimated temperature variation, $\delta$ is an uncertainty associated with a native clock used by the receiver, $T_{rx}$ is the elapsed time, and n is fractional or whole number greater than 1.

43. The apparatus of claim 42, wherein n is equal to 2.

44. The apparatus of claim 42, wherein n is equal to 1.75.

45. A computer-readable medium including instructions executable by a processor for receiving a transmission at a receiver, the computer-readable medium comprising:

a first set of computer-readable instructions executable by the processor to set a receive window duration for receiving the transmission to a default value based on the time interval between expected transmissions;

a second set of computer-readable instructions executable by the processor to adjust the receive window duration based on an elapsed time since last receiving a good transmission, the adjusted receive window duration being a nonlinear function of the elapsed time; and a third set of computer-readable instructions executable by the processor to open a receive window to listen for the transmission for an amount of time equal to the adjusted receive window duration.

46. The computer-readable medium of claim 45, further comprising:

a fourth set of computer-readable instructions executable by the processor to reset the receive window duration to the default value if the transmission is successfully received.

47. The computer-readable medium of claim 45, further comprising:

a fifth set of computer-readable instructions executable by the processor to adjust the receive window duration to be proportional to an estimated temperature variation and an uncertainty associated with a native clock used by the receiver.

48. The computer-readable medium of claim 45, wherein the receive window duration is adjusted as an exponential function of the elapsed time.

49. The computer-readable medium of claim 48, wherein the adjusted receive window duration is equal to $\Delta T * \delta * 2^{T_{rx}}$, where $\Delta T$ is an estimated temperature variation, $\delta$ is an uncertainty associated with a native clock used by the receiver, and $T_{rx}$ is the elapsed time.

50. The computer-readable medium of claim 45, wherein the receive window duration is adjusted as a function of a given power of the elapsed time.

51. The computer-readable medium of claim 50, wherein the adjusted receive window duration is equal to $\Delta T * \delta * T_{rx}^{n}$, where $\Delta T$ is an estimated temperature variation, $\delta$ is an uncertainty associated with a native clock used by the receiver, $T_{rx}$ is the elapsed time, and n is fractional or whole number greater than 1.

52. The computer-readable medium of claim 51, wherein n is equal to 2.

53. The computer-readable medium of claim 51, wherein n is equal to 1.75.

54. A method of receiving a transmission at a receiver, the method comprising:

setting a receive window duration for receiving the transmission based on an elapsed time since last receiving a good transmission, the receive window duration being an exponential function of the elapsed time or a function of a given power of the elapsed time; and opening a receive window to listen for the transmission for an amount of time equal to the set receive window duration.

55. A method of receiving a transmission at a receiver, the method comprising:

setting a receive window duration for receiving the transmission based on an elapsed time since last receiving a good transmission, the receive window duration being a nonlinear function of the elapsed time, wherein results of the nonlinear function are calculated dynamically or stored in a look-up table; and opening a receive window to listen for the transmission for an amount of time equal to the set receive window duration.

56. A method of receiving a transmission at a receiver, the method comprising:

setting a receive window duration for receiving the transmission based on an elapsed time since last receiving a good transmission, the receive window duration being a nonlinear function of the elapsed time, wherein the nonlinear function is a step function providing a first receive window duration for a given period of time and a second receive window duration after the given period of time, the second receive window duration being larger than the first receive window duration; and opening a receive window to listen for the transmission for an amount of time equal to the set receive window duration.

* * * * *